United States Patent
Calmes

(10) Patent No.: US 11,629,983 B2
(45) Date of Patent: Apr. 18, 2023

(54) ULTRASONIC FLOWMETER TRANSDUCERS AND REFLECTOR ARRANGED TO MEASURE UNDISTURBED FLOW THROUGH AN OPEN CROSS-SECTION

(71) Applicant: Zenner International GmbH & Co. KG, Saarbruecken (DE)

(72) Inventor: Manfred Calmes, Merzig-Mondorf (DE)

(73) Assignee: Zenner International GmbH & Co. KG, Saarbruecken (DE)

( * ) Notice: Subject to any disclaimer, the term of this patent is extended or adjusted under 35 U.S.C. 154(b) by 244 days.

(21) Appl. No.: 17/053,209

(22) PCT Filed: May 8, 2019

(86) PCT No.: PCT/DE2019/100415
§ 371 (c)(1),
(2) Date: Nov. 5, 2020

(87) PCT Pub. No.: WO2019/214780
PCT Pub. Date: Nov. 14, 2019

(65) Prior Publication Data
US 2021/0372836 A1    Dec. 2, 2021

(30) Foreign Application Priority Data

May 9, 2018    (DE) ................... 20 2018 102 622.4

(51) Int. Cl.
*G01F 1/66* (2022.01)
*G01F 1/667* (2022.01)
*G01F 15/14* (2006.01)

(52) U.S. Cl.
CPC .............. *G01F 1/662* (2013.01); *G01F 1/667* (2013.01); *G01F 15/14* (2013.01)

(58) Field of Classification Search
None
See application file for complete search history.

(56) References Cited

U.S. PATENT DOCUMENTS 7,819,021 B2    10/2010   Sonnenberg et al.
10,704,941 B2 *  7/2020   Kuhlemann ............ G01F 15/18
(Continued)

FOREIGN PATENT DOCUMENTS

CN    202661118 U    1/2013
CN    103033224 A    4/2013
(Continued)

OTHER PUBLICATIONS

International Search Report in PCT/DE2019/100415, dated Aug. 16, 2019.

*Primary Examiner* — Harshad R Patel
(74) *Attorney, Agent, or Firm* — Collard & Roe, P.C.

(57) ABSTRACT

An ultrasonic meter for measuring a flow rate or flow volume includes a fluid inlet, a fluid outlet, a flow channel arranged between the fluid inlet and the fluid outlet, two ultrasonic transducers and at least one reflector for ultrasonic signals. Ultrasonic transducers are arranged outside the flow channel, entrance and exit openings for ultrasonic signals, each running obliquely relative to the longitudinal axis of the flow channel, are provided between the ultrasonic transducers and the flow channel, and the reflector is arranged on the wall of the flow channel opposite the entrance and exit openings such that it reflects ultrasonic signals of the ultrasonic transducers.

6 Claims, 3 Drawing Sheets

(56) References Cited

U.S. PATENT DOCUMENTS

| | | | | |
|---|---|---|---|---|
| 2008/0236296 A1* | 10/2008 | Sonnenberg | ............ | G01F 1/662 |
| | | | | 73/861.26 |
| 2015/0204705 A1* | 7/2015 | Forster | .................... | G01F 1/667 |
| | | | | 73/861.28 |
| 2016/0334251 A1* | 11/2016 | Otsu | ........................ | G01F 15/14 |
| 2020/0386591 A1* | 12/2020 | Scarborough, III | .... | G01F 1/667 |
| 2021/0131845 A1* | 5/2021 | Scarborough, III | .... | G01F 1/662 |

FOREIGN PATENT DOCUMENTS

| | | |
|---|---|---|
| CN | 204855039 U | 12/2015 |
| DE | 195 49 162 A1 | 8/1996 |
| EP | 1 798 528 A1 | 6/2007 |
| EP | 1 967 828 A1 | 9/2008 |
| EP | 2 270 439 A1 | 1/2011 |
| WO | 2018/011372 A1 | 1/2018 |

\* cited by examiner

ULTRASONIC FLOWMETER TRANSDUCERS AND REFLECTOR ARRANGED TO MEASURE UNDISTURBED FLOW THROUGH AN OPEN CROSS-SECTION

CROSS REFERENCE TO RELATED APPLICATIONS

This application is the National Stage of PCT/DE2019/100415 filed on May 8, 2019, which claims priority under 35 U.S.C. § 119 of German Application No. 20 2018 102 622.4 filed on May 9, 2018, the disclosure of which is incorporated by reference. The international application under PCT article 21(2) was not published in English.

BACKGROUND OF THE INVENTION

1. Field of the Invention

The invention relates to an ultrasonic meter for measuring a flow rate or flow volume, comprising a fluid inlet, a fluid outlet and a flow channel arranged between the fluid inlet and the fluid outlet, two ultrasonic transducers and at least one reflector for ultrasonic signals, wherein a temperature sensor is provided which can be washed over by fluid in the flow channel.

2. Description of the Related Art

From EP 1 798 528 A1, a flow-rate measuring device for fluid media is known, consisting of a housing whose interior is bounded by a housing inner wall, a measurement tube that is arranged inside the housing and determines a measurement section for a transit time measurement, and an ultrasonic measuring device comprising at least one ultrasonic transducer for emitting ultrasonic waves into the housing interior, at least one deflecting mirror at the measurement section having a front side by means of which the ultrasonic waves are deflected into the measurement section, and a rear side opposite the front side, wherein the deflecting mirror has a support arm which is held between the housing inner wall and the measurement tube. In this device, the deflecting mirror is arranged in the flow, which distorts the measurement result.

From EP 2 270 439 A1, an ultrasonic flow meter is known, comprising a housing, a measuring tube, a reflector unit comprising a reflector, which is configured to reflect ultrasonic signals, and a reflector holder, which is inserted into the housing from an opening in the housing, and first and second ultrasonic transducers, which are mounted in relation to the reflector unit and in relation to the measuring tube such that the reflector is configured to reflect ultrasonic signals between the first and second ultrasonic transducers, wherein the reflector unit is formed as a single monolithic polymer element in a single moulding process. Here too, the reflector unit is arranged within the flow, which leads to a distortion of the measurement results.

EP 1 967828 A1 describes a fluid counter having a measuring tube housing, a measured section located in the measuring tube housing, an ultrasonic transducer arrangement composed of at least one ultrasonic transducer for generating an ultrasonic signal and/or for converting an ultrasonic signal that passes through the measured section into an electrical signal, and a deflection device for deflecting the ultrasonic signal, wherein, with the fluid counter in the installation position, the ultrasonic signal does not strike the deflection device from above. The purpose of this is to avoid the accumulation of bubbles in the region of the deflection device.

DE 195 49 162 A1 relates to an ultrasonic flow meter for measuring flows of liquid or gas through a measuring tube which is equipped with ultrasonic transducers. The ultrasound here is reflected by a tube wall which has at least one focusing reflecting plane. At least one focusing reflecting plane is curved in the form of an ellipse and the transducers are placed in the focal points of the ellipse.

WO 2018/011372 A1 describes a flow meter having at least two ultrasonic sensors spaced apart from each other, wherein a coupling of measuring signals into and out of a fluid is performed via a coupling element. The measuring channel has approximately an oval shape or is tapered in a roughly trapezoidal shape to a region opposite the sensors.

From CN 204 855 039 U, an ultrasonic calorimeter with two transducers, a temperature sensor and an ultrasonic wave reflection sheet is known.

CN 202 66661 118 U relates to a flow meter having two ultrasonic transducers. The intersection of the emission surface of the two ultrasonic transducers here is on the inner surface of an ultrasonic reflector.

CN 103 033 224 A describes an ultrasonic flowmeter, wherein the lower end has a vertical cylindrical hole and the middle part of the meter piston and a disc-shaped reflective antenna are installed in the vertical cylindrical hole.

SUMMARY OF THE INVENTION

The object of the present invention consists in creating an ultrasonic meter according to the preamble, in which fluid flow through the flow channel is, as far as possible, undisturbed in order to achieve an undistorted measurement result.

This object is achieved according to the invention with an ultrasonic meter according to the preamble by the fact that the flow channel can be axially and radially fixed relative to the meter housing using the temperature sensor.

In contrast to ultrasonic meters according to the prior art, the ultrasonic signal enters the flow channel obliquely, preferably at an angle of 45°, and also exits the flow channel again obliquely. By mounting the ultrasonic transducers outside the flow channel and arranging the reflector in the region of the wall of the flow channel, it is ensured that the passage of liquid through the flow channel is not disturbed by these elements. A distortion of the measurement result is thereby avoided. This arrangement also avoids a direct flow onto and/or around the reflector elements and/or the ultrasonic transducers, thus avoiding the risk of wear or damage, e.g. due to the flow forces or to particles that are present in the flow. Thanks to the lateral arrangement of the ultrasonic transducers and the reflectors, disadvantageous bubble formation at the highest point of the measuring arrangement, e.g. upstream of the ultrasonic transducers, is also avoided.

The ultrasonic signal travels from a first ultrasonic transducer through the entrance opening into the flow channel, crosses the flow channel, is reflected at the reflector, crosses the flow channel again, travels through an exit opening to the second ultrasonic transducer and then back to the first ultrasonic transducer, after which the volumetric flow rate of the fluid in the flow channel is recorded using the transit time of the signal.

In order to achieve high measuring precision over the entire temperature range, a temperature sensor can be employed which can be washed over by fluid in the flow channel.

This temperature sensor can advantageously be used for the axial and radial fixing of the flow channel relative to the meter housing.

It is further provided within the framework of the invention that the flow channel has a substantially rectangular, preferably substantially square, cross-section.

In this case, the corners of the rectangle or square can be rounded. The configuration of the flow channel in a rectangular shape enables the region through which the flow passes to be (almost) completely covered by the laterally arranged reflector.

In this context it is advantageous for the flow channel to be arranged such that it is inclined relative to the counting mechanism housing.

This permits a battery unit to be positioned above the tube axis, thus taking up the smallest possible space both horizontally and vertically relative to the tube axis.

It is advantageous for a counting mechanism unit to be provided which is encapsulated with a fluid-impermeable material.

By encapsulating the counting mechanism unit with a fluid-impermeable material, it is reliably protected from fluids.

Furthermore, it is advantageous for a replaceable battery unit to be provided for powering the counting mechanism unit, wherein a battery is encapsulated with a fluid-impermeable material in the battery unit.

The battery unit preferably comprises a battery, which is completely encapsulated in the housing of the battery unit and which can be replaced without any aids, or with simple aids, by way of a plug-in connection to the counting mechanism unit, which is sealed by one or more sealing elements. The imperviousness (according to protection class IP68) of both the battery element and the complete counting mechanism is completely maintained here. Suitable encapsulating compounds for such components are known.

BRIEF DESCRIPTION OF THE DRAWINGS

An exemplary embodiment of the invention will be explained in more detail below with the aid of drawings.

The figures show the following.

DETAILED DESCRIPTION OF THE PREFERRED EMBODIMENTS

Figure 1:
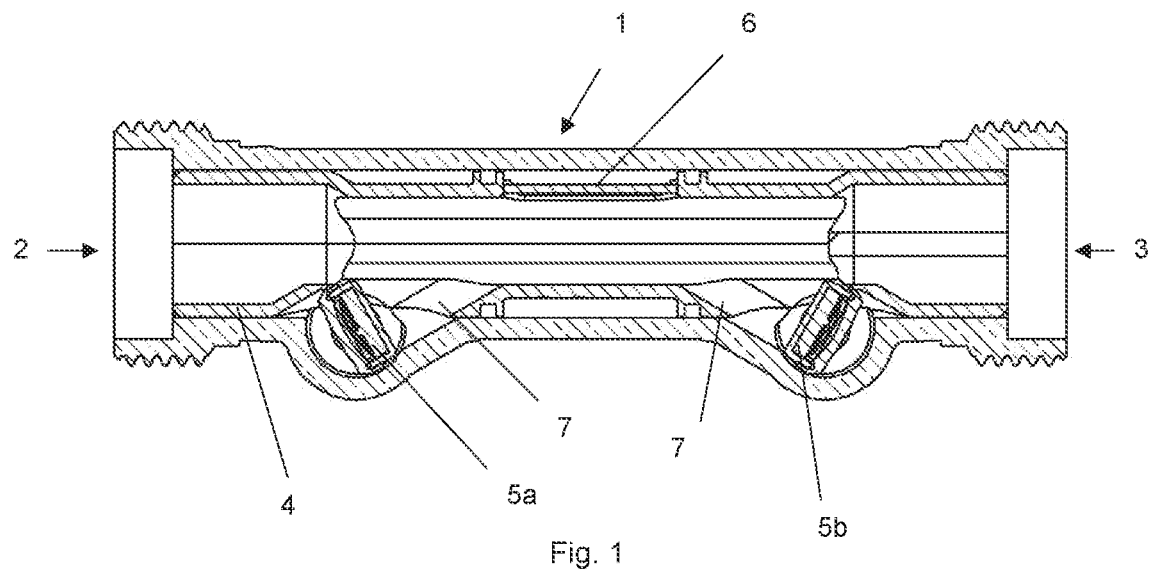
FIG. 1: a sectional diagram of an ultrasonic meter according to the invention.

As can be seen from FIG. 1, the ultrasonic meter (1) according to the invention comprises a fluid inlet (2) and a fluid outlet (3) as well as a flow channel (4) connecting the fluid inlet (2) to the fluid outlet (3).

The flow channel (4) forms a measuring region that extends in a rectilinear fashion in a flow direction.

Mounted laterally at the entrance and exit of the flow channel (4) are ultrasonic transducers (5a, 5b), which transmit/receive the ultrasonic signal to/from the second ultrasonic transducer (5b, 5a) via a reflector (6), which is likewise mounted laterally.

The ultrasonic transducers (5a, 5b) and the reflector are arranged such that the fluid can flow undisturbed through an "open cross-section", i.e. such that the flow is not affected by these elements. The reflector (6) is arranged on the inner wall of the flow channel (4).

This arrangement avoids a direct flow onto and/or around the reflector (6) and/or the ultrasonic transducers (5a, 5b), thus avoiding the risk of wear or damage, which may be caused by the flow forces and/or by particles that are present in the flow.

Between the ultrasonic transducers (5a, 5b) and the flow channel (4), entrance and exit openings (7) for the ultrasonic signal are provided, each running obliquely (preferably at an angle of 45°) relative to the longitudinal axis of the flow channel (4).

Thanks to the lateral arrangement of the ultrasonic transducers (5a, 5b) and the reflector, disadvantageous bubble formation at the highest point of the measuring arrangement, e.g. upstream of the ultrasonic transducers (5a, 5b), can be avoided.

Figure 2A:
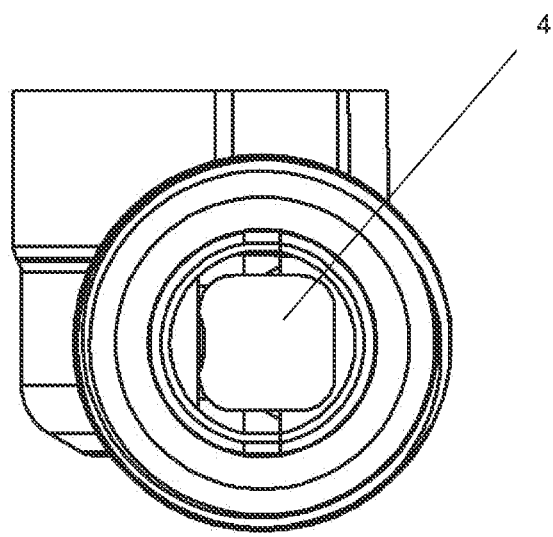
FIG. 2a: a front view of a counting mechanism unit according to the invention with a flow channel arranged such that it is straight relative to the counting mechanism housing.
Figure 2B:
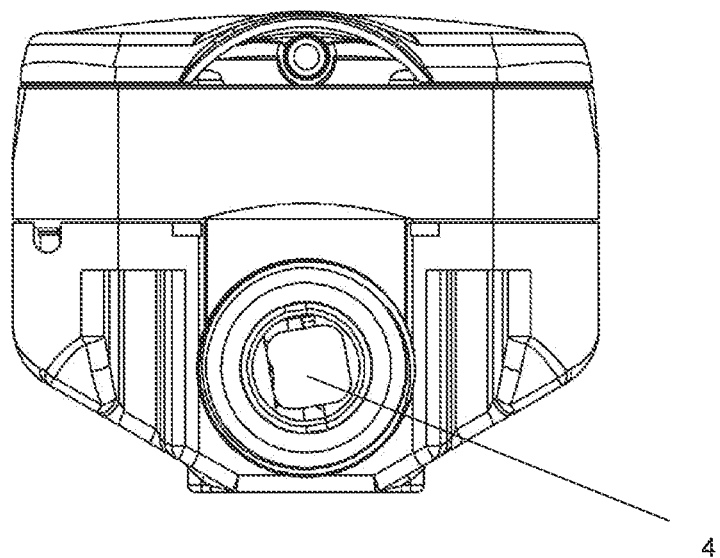
FIG. 2b: a front view of a counting mechanism unit according to the invention with a flow channel arranged such that it is inclined relative to the counting mechanism housing.

The design of the flow channel (4) in a rectangular shape can be seen in FIGS. 2a and 2b. It enables the region through which the flow passes to be (almost) completely covered by the laterally arranged reflector (6).

In the embodiment according to FIG. 2b, the flow channel (4) is arranged such that it is inclined relative to the meter housing to allow a battery unit to be positioned above the tube axis, thus taking up the smallest possible space both horizontally and vertically relative to the tube axis.

The ultrasonic signals are transmitted by the ultrasonic transducers to a counting mechanism unit (8), which is completely encapsulated with a fluid-impermeable material and is supplied with power by a battery unit (9).

Figure 3:
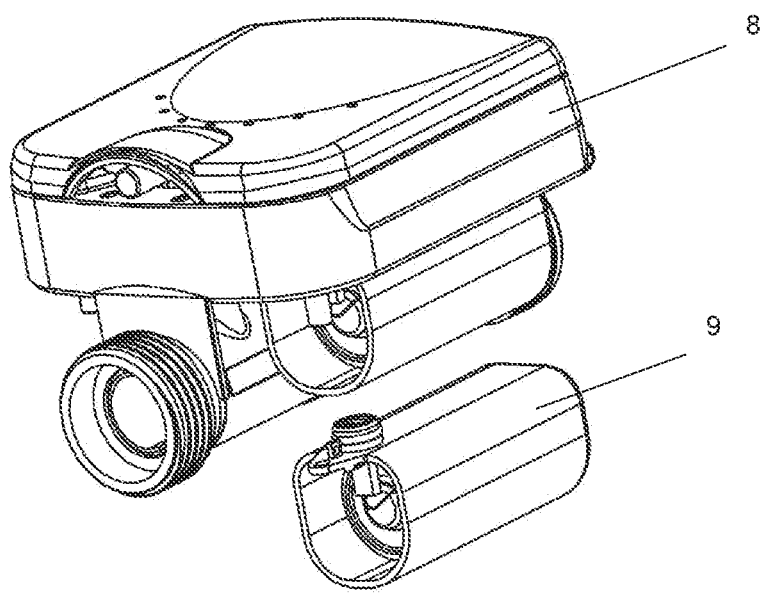
FIG. 3: the plug-in connection between the battery unit and the counting mechanism unit.

The battery unit (9) comprises a battery (or a plurality of batteries), which is completely encapsulated with fluid-impermeable material in a housing, wherein the battery unit (9)—as illustrated in FIG. 3—can be replaced without any aids, or using simple aids, by way of a plug-in connection to the counting mechanism unit (8), which is sealed by one or more sealing elements. The imperviousness of both the battery unit (9) and the complete counting mechanism unit (8) is completely maintained here.

Figure 4:
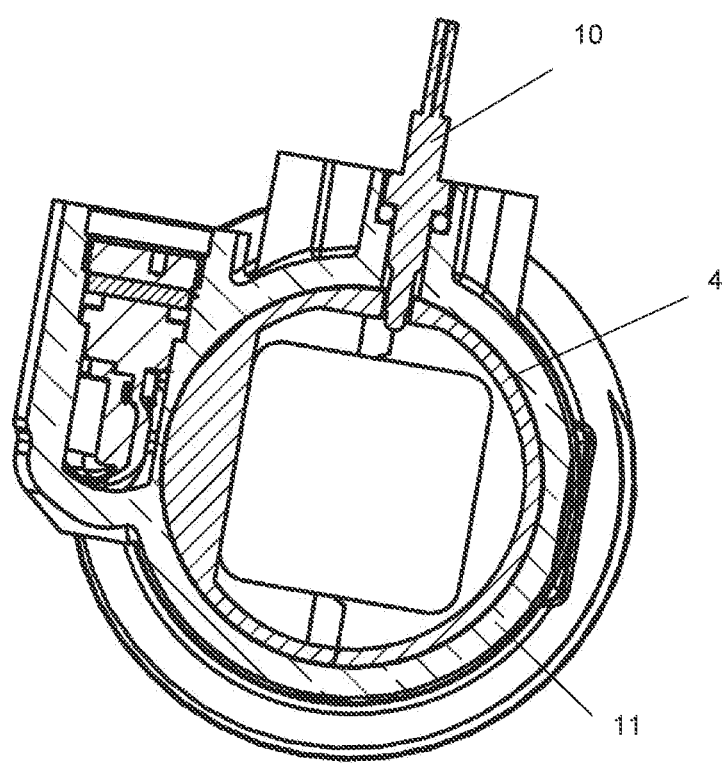
FIG. 4: the fixing of the measuring channel with the aid of a temperature sensor.

As illustrated in FIG. 4, a temperature sensor 10, which can be washed over by fluid in the flow channel 4, is preferably provided to increase the measuring precision.

Advantageously, the flow channel 4 can be axially and radially fixed relative to the meter housing 11 using the temperature sensor 10, which—as can be seen from FIG. 4—creates a form-fitting and/or force-fitting connection between the meter housing 11 and the flow channel 4.

The invention claimed is:

1. An ultrasonic meter for measuring a flow rate or flow volume, comprising:
    a fluid inlet;
    a fluid outlet;
    a flow channel arranged between the fluid inlet and the fluid outlet;
    two ultrasonic transducers; and
    at least one reflector for ultrasonic signals;
    wherein the ultrasonic transducers are arranged outside the flow channel and entrance and exit openings for ultrasonic signals, each running obliquely relative to the longitudinal axis of the flow channel, are provided between the ultrasonic transducers and the flow channel;

wherein the at least one reflector is arranged on a wall of the flow channel opposite the entrance and exit openings such that it reflects ultrasonic signals of the at least one ultrasonic transducer;

wherein a temperature sensor is provided, which can be washed over by fluid in the flow channel; and wherein the flow channel can be axially or radially fixed relative to a meter housing using the temperature sensor.

2. The ultrasonic meter according to claim 1, wherein the flow channel has a substantially rectangular cross-section.

3. The ultrasonic meter according to claim 2, wherein the flow channel is arranged such that it is inclined relative to a counting mechanism housing of the ultrasonic meter.

4. The ultrasonic meter according to claim 1, wherein the flow channel has a square cross-section.

5. The ultrasonic meter according to claim 1, wherein a counting mechanism unit is provided, which is encapsulated with a fluid-impermeable material.

6. The ultrasonic meter according to claim 1,
wherein a replaceable battery unit is provided for powering a counting mechanism unit; and
wherein a battery is encapsulated with a fluid-impermeable material in the battery unit.

\* \* \* \* \*